US012469521B2

(12) United States Patent
Fan et al.

(10) Patent No.: US 12,469,521 B2
(45) Date of Patent: Nov. 11, 2025

(54) HARD DISK HOLDER, HARD DISK, AND ELECTRONIC DEVICE

(71) Applicant: HUAWEI TECHNOLOGIES CO., LTD., Shenzhen (CN)

(72) Inventors: Yiwei Fan, Shenzhen (CN); Dawulietibieke Jianahemaiti, Shenzhen (CN); Cheng Huang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 210 days.

(21) Appl. No.: 18/190,776

(22) Filed: Mar. 27, 2023

(65) Prior Publication Data
US 2023/0230620 A1 Jul. 20, 2023

Related U.S. Application Data

(63) Continuation of application No. PCT/CN2021/117849, filed on Sep. 11, 2021.

(30) Foreign Application Priority Data

Sep. 27, 2020 (CN) .......................... 202011036188.7

(51) Int. Cl.
G06F 1/16 (2006.01)
G11B 33/08 (2006.01)
(Continued)

(52) U.S. Cl.
CPC .............. *G11B 33/12* (2013.01); *G11B 33/08* (2013.01); *G11B 33/10* (2013.01); *G11B 33/14* (2013.01)

(58) Field of Classification Search
CPC ....... G06F 1/187; G06F 1/1656; G06F 1/1658
See application file for complete search history.

(56) References Cited

U.S. PATENT DOCUMENTS 4,937,806 A * 6/1990 Babson ................ G11B 33/122
360/137
6,166,901 A * 12/2000 Gamble .................. G06F 1/184
248/560
(Continued)

FOREIGN PATENT DOCUMENTS

CN 201170883 Y 12/2008
CN 202110826 U 1/2012
(Continued)

*Primary Examiner* — Anthony Q Edwards
(74) *Attorney, Agent, or Firm* — Leydig, Voit & Mayer, Ltd.

(57) ABSTRACT

A hard disk holder is provided including an integrated sheet metal framework. The integrated sheet metal framework is a main body structure of the hard disk holder, and a head and a tail of the integrated sheet metal framework are clamped to form a closed framework. The integrated sheet metal framework specifically includes a first side plate, a head end plate, a second side plate, and a tail end plate that are formed by sheet metal and are disposed in sequence. An inner side of the first side plate and an inner side of the second side plate each have a limiting bulge, and the hard disk body has limiting holes. The limiting bulges adapt to the limiting holes. When the hard disk body is mounted to the hard disk holder, the limiting bulges extend into the limiting holes to form a limiting structure.

20 Claims, 5 Drawing Sheets

(51) Int. Cl.
*G11B 33/10* (2006.01)
*G11B 33/12* (2006.01)
*G11B 33/14* (2006.01)

(56) References Cited

U.S. PATENT DOCUMENTS

| | | | | |
|---|---|---|---|---|
| 6,231,224 B1* | 5/2001 | Gamble | ............... | G11B 33/124 |
| | | | | 362/85 |
| 6,407,913 B1* | 6/2002 | Peachey | ................. | G06F 1/187 |
| | | | | 361/679.33 |
| 6,421,236 B1* | 7/2002 | Montoya | ............... | H05K 9/0016 |
| 6,633,481 B2* | 10/2003 | Pavol | ..................... | G11B 33/08 |
| 6,891,723 B1* | 5/2005 | Lin | ...................... | G11B 33/025 |
| | | | | 361/679.33 |
| 7,280,352 B2* | 10/2007 | Wilson | ................... | G06F 1/184 |
| 8,045,326 B1* | 10/2011 | Reznikov | ............... | G06F 1/187 |
| | | | | 361/679.33 |
| 8,113,474 B1* | 2/2012 | Li | ........................ | G11B 33/124 |
| | | | | 248/221.11 |
| 8,861,193 B1 | 10/2014 | Svenkeson et al. | | |
| 9,785,205 B2* | 10/2017 | Lien | ........................ | G06F 1/187 |
| 10,228,734 B1* | 3/2019 | Hsieh | ..................... | G06F 1/187 |
| 10,289,172 B2* | 5/2019 | Yang | .................... | G11B 33/124 |
| 10,437,294 B2* | 10/2019 | Lin | ........................ | G06F 1/181 |
| 2002/0101713 A1* | 8/2002 | Eland | ..................... | G06F 1/187 |
| | | | | 361/679.42 |
| 2003/0155471 A1* | 8/2003 | Dean | .................... | G11B 33/128 |
| 2008/0298005 A1* | 12/2008 | Deng | .................... | G06F 1/187 |
| | | | | 361/825 |
| 2009/0129009 A1* | 5/2009 | Zhang | ................. | G11B 33/124 |
| | | | | 361/679.34 |
| 2019/0096442 A1 | 3/2019 | Hu | | |

FOREIGN PATENT DOCUMENTS

| | | |
|---|---|---|
| CN | 203397281 U | 1/2014 |
| CN | 205540479 U | 8/2016 |
| CN | 207516888 U | 6/2018 |
| CN | 207946751 U | 10/2018 |
| CN | 110347222 A | 10/2019 |
| CN | 110780712 A | 2/2020 |
| CN | 210223569 U | 3/2020 |
| CN | 210271777 U | 4/2020 |
| CN | 210378484 U | 4/2020 |
| JP | 2013131269 A | 7/2013 |

* cited by examiner

HARD DISK HOLDER, HARD DISK, AND ELECTRONIC DEVICE

CROSS-REFERENCE TO RELATED APPLICATIONS

This application is a continuation of International Application No. PCT/CN2021/117849, filed on Sep. 11, 2021, which claims priority to Chinese Patent Application No. 202011036188.7, filed on Sep. 27, 2020. The disclosures of the aforementioned applications are hereby incorporated by reference in their entireties.

TECHNICAL FIELD

Embodiments of this application relate to the field of server technologies, and in particular, to a hard disk holder, a hard disk, and an electronic device.

BACKGROUND

As a storage medium in the field of servers, hard disks are essential components for servers. Mounting a hard disk on a server bracket or a housing is also an important technology in the art.

FIG. 1 is a schematic diagram of a structure of a hard disk in the conventional technology. As shown in FIG. 1, in the conventional technology, a hard disk 200 includes a hard disk holder 210 and a hard disk body 220. The hard disk body 220 is fastened on the hard disk holder 210, and the hard disk 200 is mounted on an electronic device by using the hard disk holder 210. The hard disk body 220 and the hard disk holder 210 each include four screw holes 230. Four screws 240 are used to implement a fastened connection between the hard disk body 220 and the hard disk holder 210. In this solution, an operation of mounting the screws 240 one by one during assembling of the hard disk 200 is complex. The hard disk 200 is highly demanded. In this solution, lots of human and material resources and labor hours are consumed for production and maintenance of the hard disk 200, and high costs are also incurred. In addition, with development of technologies, a requirement for miniaturization of a product structure is increasingly high. To maintain performance of the hard disk 200, the hard disk 200 also needs to have a good heat dissipation capability.

SUMMARY

This application provides a hard disk holder, a hard disk and an electronic device, to thin a hard disk holder, reduce a size of a hard disk, improve integration of an electronic device, improve efficiency of assembling a hard disk, and reduce costs.

According to a first aspect, this application provides a hard disk holder. The hard disk holder is configured to carry and mount a hard disk body. In a specific technical solution, the hard disk holder includes an integrated sheet metal framework. The integrated sheet metal framework is a main body structure of the hard disk holder, and a head and a tail of the integrated sheet metal framework are clamped to form a closed framework configured to mount the hard disk body. Specifically, the integrated sheet metal framework includes a first side plate, a head end plate, a second side plate, and a tail end plate that are formed by sheet metal and are disposed in sequence. An inner side of the first side plate and an inner side of the second side plate each have a limiting bulge, and the hard disk body has limiting holes. The limiting bulges adapt to the limiting holes. When the hard disk body is mounted to the hard disk holder, the limiting bulges extend into the limiting holes to form a limiting structure. Thus, the hard disk body can be reliably mounted in the hard disk holder. In the technical solution of this application, the hard disk holder is the integrated sheet metal framework. Sheet metal has high strength, so the hard disk holder can be made to be thin, thereby reducing a size of the hard disk and helping improve an integration of the electronic device. In addition, the sheet metal has a good thermal conductivity, which can improve heat dissipation effect on the hard disk and prolong a service life of the hard disk. In this solution, elasticity of the sheet metal can be used to implement clamping, so that it is convenient to mount and remove the hard disk body, thereby saving human and material resources and reducing costs.

To improve universality of the hard disk holder in this embodiment of this application, the limiting holes of the hard disk body may be screw holes, and the limiting bulges can adapt to the screw holes, to limit the hard disk body. The hard disk holder in this application can adapt to hard disk bodies in the market, and no additional hard disk bodies need to be prepared.

Specifically, to achieve clamping between the head and the tail of the integrated sheet metal framework, the first side plate may be clamped to the tail end plate. Specifically, the tail end plate may have a first clamping mount, and the first side plate has a first clamping head; and the first clamping head is clamped to the first clamping mount. Thus, the tail end plate is clamped to the first side plate. In this solution, the clamping structure of the integrated sheet metal framework is located between the tail end plate and the first side plate. Since the tail end plate is inserted into a housing of the electronic device, the clamping structure between the first side plate and the tail end plate is not likely to interfere with another structure. In addition, after the hard disk is plugged to the electronic device, the foregoing clamping structure is located on an inner side of the hard disk, and a problem that the clamping structure is unlocked by a misoperation is not likely to occur.

The tail end plate may be specifically a bent tail end plate, and a concave surface of the bent tail end plate faces an inner side of the hard disk holder. The bent tail end plate has a good elasticity. The bent tail end plate is pressed towards the inner side of the hard disk holder, so that the first clamping mount can be separated from the first clamping head, to unlock the clamping structure between the tail end plate and the first side plate, and the operation is convenient.

Alternatively, to implement head-to-tail clamping of the integrated sheet metal framework, the head end plate may be further clamped to the first side plate. Specifically, the head end plate may also have a first clamping mount, and the first side plate may have a first clamping head. The first clamping mount is clamped to the first clamping head, so that the head end plate and the first side plate can be clamped.

The head end plate may also be a bent head end plate. A concave surface of the bent head end plate faces the inner side of the hard disk holder. The bent head end plate has a good elasticity and has a margin for being pushed towards the inner side of the hard disk holder. A user pushes the bent head end plate inwards from an outer side of the hard disk holder, so that the first clamping head can be separated from the first clamping mount, thereby unlocking the clamping structure between the head end plate and the first side plate.

A pull handle is further mounted on an outer side of the head end plate. When the user pulls the hard disk out of a hard disk mounting slot of the electronic device, the pull handle may be pulled, and the operation is convenient.

Sides of the first side plate and the second side plate close to the head end plate have second clamping heads, and a side wall of the hard disk mounting slot of the electronic device has second clamping mounts. The second clamping heads are clamped with the second clamping mounts, so that the hard disk can be locked in the hard disk mounting slot of the electronic device. It is convenient to pull the hard disk out of the hard disk mounting slot.

To facilitate unlocking between the second clamping heads and the second clamping mounts, the hard disk holder may have an elastic pull handle. One end of the elastic pull handle is connected to the side of the first side plate that is close to the head end plate, and the other end is connected to the side of the second side plate that is close to the head end plate. When the elastic pull handle is pulled to one side far away from the head end plate, the first side plate and the second side plate may have a trend of approaching each other, so that the second clamping heads and the second clamping mounts may be unlocked. In this solution, when the elastic pull handle is pulled, on the one hand, the hard disk holder can be unlocked from the hard disk mounting slot, and on the other hand, the hard disk can be pulled out of the hard disk mounting slot. Therefore, an action of removing the hard disk from the hard disk mounting slot is simple and convenient.

In addition, the first side plate and the second side plate of the hard disk holder each have a supporting plate. The supporting plate is perpendicular to the first side plate and the second side plate and is configured to support the hard disk body. In this solution, in addition to the limiting bulges and the limiting holes that limit the hard disk, the supporting plate can also support the hard disk body, thereby improving reliability of fastening the hard disk body in the hard disk holder.

Since the sheet metal framework is made of a metal material, a short circuit problem may occur in an exposed circuit board of the hard disk body. Generally, an exposed circuit board may exist on one side of the hard disk that faces the supporting plate. Therefore, an inner side of the supporting plate of this application further has an insulation pad. That is, an insulation pad is provided between the supporting plate and the hard disk body, to prevent the short circuit problem of the hard disk body.

In addition, the hard disk holder may further include a light pipe mounting slot. The light pipe mounting slot is configured to mount a light pipe, and extends in an extending direction of the first side plate. In this case, the light pipe may be mounted in the light pipe mounting slot, to conduct, to an outer side of the hard disk, light of an indicator lamp of a circuit board of the electronic device that indicates a working state of the hard disk, so that an operator can observe the light.

Vibration attenuation members may be further disposed on outer sides of the first side plate and the second side plate. The vibration attenuation member can reduce vibration that may be generated after the hard disk is mounted in the hard disk mounting slot, to improve reliability of mounting of the hard disk, and also help prolong the service life of the hard disk.

A specific shape of the vibration attenuation member is not limited, and the vibration attenuation member may be a vibration attenuation protruding dot, a vibration attenuation protruding bar, or a vibration attenuation protruding mesh. That is, the vibration attenuation member protrudes from the first side plate and the second side plate, and may be in a dot shape, a bar shape, or a mesh shape. An appropriate manner is selected based on a requirement.

In addition, a manner of forming the vibration attenuation member is not limited. For example, the vibration attenuation member of the first side plate and the first side plate may be of an integrated structure, and the vibration attenuation member of the second side plate and the second side plate may be of an integrated structure. In this solution, a preparation process of the vibration attenuation member is simple, and the vibration attenuation member is not easy to fall off.

Alternatively, the vibration attenuation members are elastic material parts, and the elastic material parts are bonded to be fastened to the first side plate and the second side plate. Due to an elasticity, the elastic material part itself can have good vibration attenuation effect.

In the technical solutions of this application, the sheet metal framework is used to prepare the hard disk holder. The sheet metal framework has high strength and can be made to be thin, which helps reduce space occupied by the hard disk. Specifically, a distance between an outer side surface of the first side plate and an outer side surface of the second side plate may be less than or equal to 71.2 mm. That is, a width of the hard disk is not greater than 71.2 mm, so that miniaturization of the hard disk can be implemented.

According to a second aspect, this application further provides a hard disk. The hard disk includes the hard disk holder in any one of the foregoing technical solutions, and further includes a hard disk body. The hard disk body is mounted in the hard disk holder through fastening. The limiting bulges of the hard disk holder are connected to limiting holes of the hard disk body in a limiting manner, so that the hard disk body is mounted in the hard disk holder through fastening in a reliable manner. In this solution, the hard disk holder is an integrated sheet metal framework that has high strength and is thin, which helps reduce a space occupied by the hard disk and implement miniaturization of the hard disk. In addition, the integrated sheet metal framework has good heat dissipation effect, which helps improve a heat dissipation property of the hard disk and prolong a service life of the hard disk. In addition, one clamping structure can be used to lock the hard disk holder, and is convenient to unlock, which helps improve assembling efficiency of the hard disk.

The hard disk further includes a light pipe. The light pipe is mounted in the light pipe mounting slot of the hard disk holder, and the light pipe is configured to conduct a light source from one side of the tail end plate of the hard disk holder to one side of the head end plate, so that a user can observe a working state of the hard disk in time from one side of the head end plate of the hard disk.

According to a third aspect, this application further provides an electronic device. The electronic device includes a housing and the hard disk in any one of the foregoing technical solutions. The housing has a hard disk mounting slot, and the hard disk is mounted in the hard disk mounting slot. Since the size of the hard disk is small, integration of the electronic device is high, which helps improve performance of the electronic device and miniaturize the electronic device.

REFERENCE NUMERALS

Figure 1:
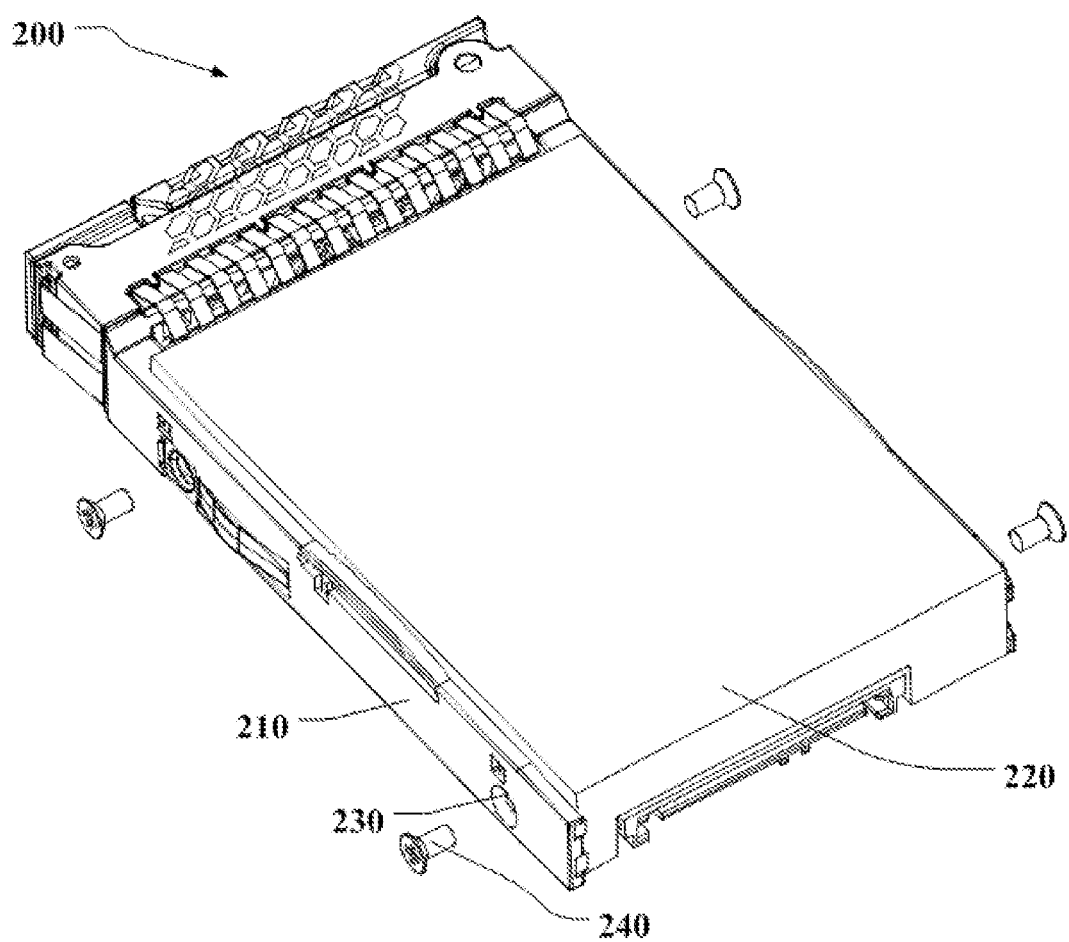
FIG. 1 is a schematic diagram of a structure of a hard disk in the conventional technology.

100: housing; 200: hard disk;
210: hard disk holder; 211: first side plate;
2111—first clamping head; 212—head end plate;
2121—pull handle; 213—second side plate;
214: tail end plate; 2141: first clamping mount;
215—limiting bulge; 216—second clamping head;
217—supporting plate; 2171—insulation pad;
218—light pipe mounting slot; 219—vibration attenuation member;
2110—reinforcer; 2120—extending portion;
220: hard disk body; 221: limiting hole;
230: screw hole; 240: screw; and
250: light pipe.

DESCRIPTION OF EMBODIMENTS

Terms used in the following embodiments are merely intended to describe specific embodiments, but are not intended to limit this application. The terms "one", "a" and "this" of singular forms used in this specification and the appended claims of this application are also intended to include expressions such as "one or more", unless otherwise specified in the context clearly.

Reference to "an embodiment". "specific embodiment", or the like described in this specification indicates that one or more embodiments of this application include a specific feature, structure, or characteristic described with reference to the embodiments. The terms "include". "have", and their variants all mean "include but are not limited to", unless otherwise specifically emphasized in another manner.

For ease of understanding a hard disk holder, a hard disk, and an electronic device provided in the embodiments of this application, the following first describes an application scenario of the hard disk holder, the hard disk, and the electronic device. The electronic device in this application may be a computing device (for example, a server), a network device (for example, a switch), a storage device (for example, a storage array), or the like. A hard disk is required in a working process of the electronic device. Specifically, the electronic device may include a housing, a circuit board, and a hard disk arranged in the housing. Specifically, the housing includes a hard disk mounting slot, and the hard disk is mounted in the hard disk mounting slot and is electrically connected to the circuit board, to realize a storage function of the hard disk. To mount the hard disk to the housing, the hard disk includes a hard disk holder and a hard disk body. The hard disk body has a storage function. The hard disk holder is configured to carry the hard disk body, and the hard disk is mounted to the hard disk mounting slot of the housing. In the conventional technology, a hard disk body and a hard disk holder are mounted by using screws, which causes a complex structure, complex operation steps, high consumption of human and material resources, and high costs. To simplify a structure of a hard disk holder, this application provides a hard disk holder, a hard disk, and an electronic device. To make the objectives, technical solutions, and advantages of this application clearer, the following further describes this application in detail with reference to the accompanying drawings.

Figure 2:
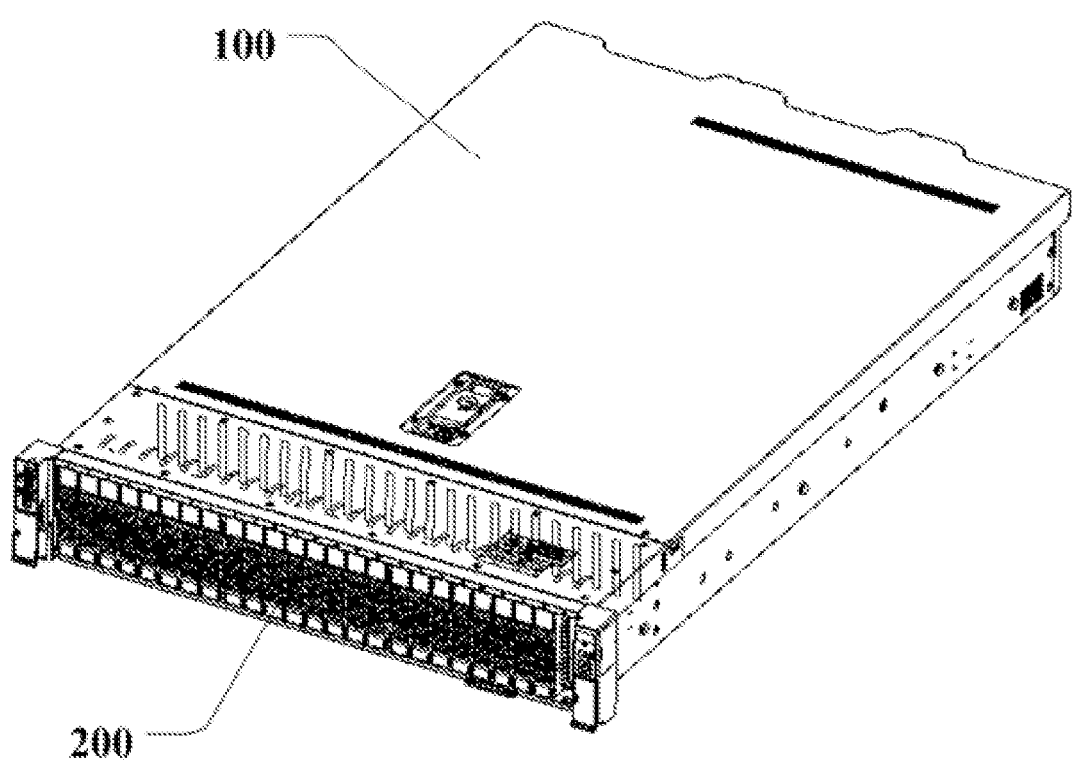
FIG. 2 is a schematic diagram of a structure of an electronic device in an embodiment of this application.

FIG. 2 is a schematic diagram of a structure of an electronic device in an embodiment of this application. As shown in FIG. 2, the electronic device includes a housing 100 and a circuit board arranged in the housing 100. The housing 100 has a hard disk mounting slot, and a hard disk 200 is mounted in the hard disk mounting slot and is electrically connected to the circuit board. Specifically, the hard disk 200 may be plugged to the hard disk mounting slot.

Figure 3:
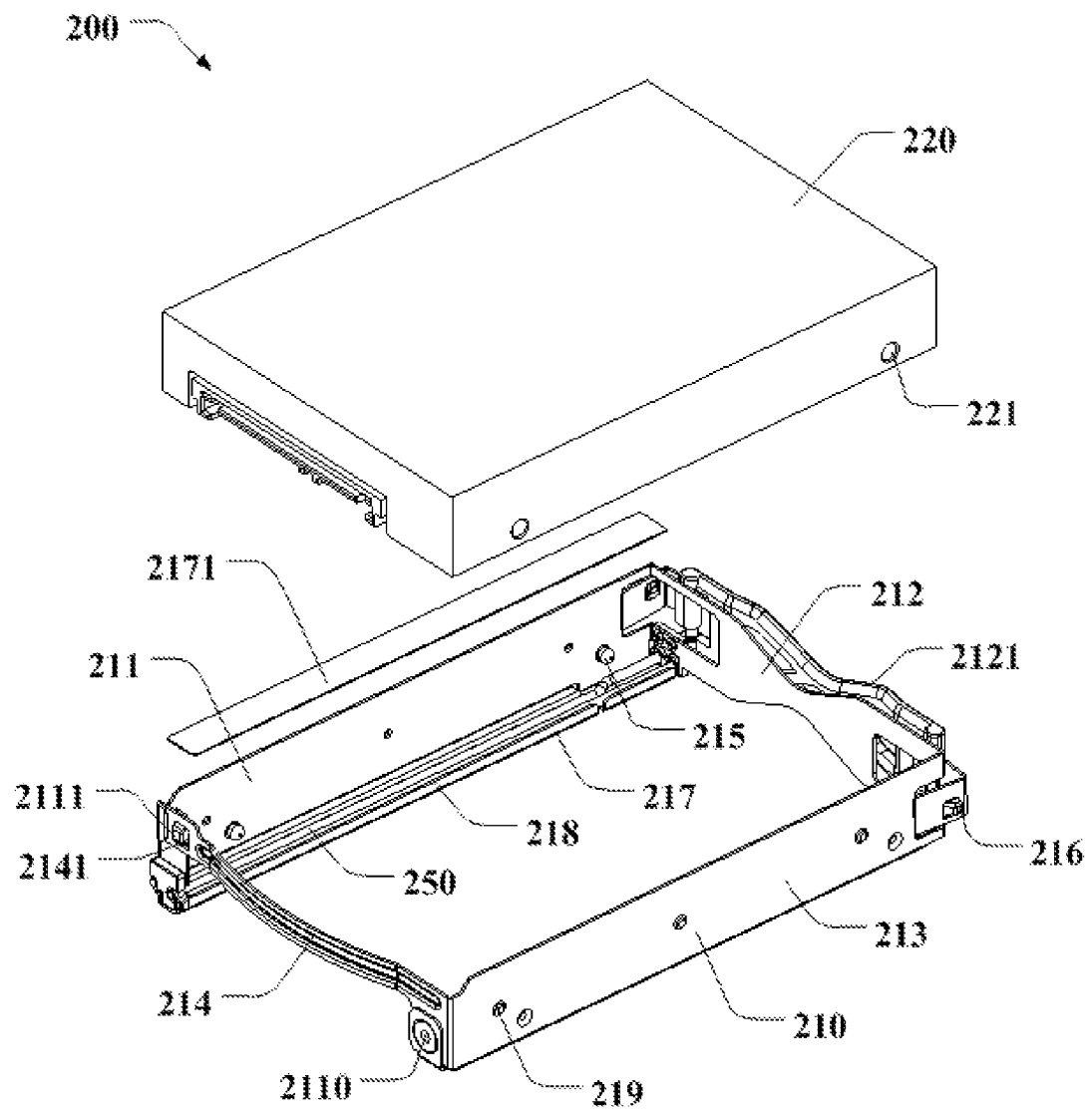
FIG. 3 is a schematic diagram of a structure of a hard disk in an embodiment of this application.
Figure 4:
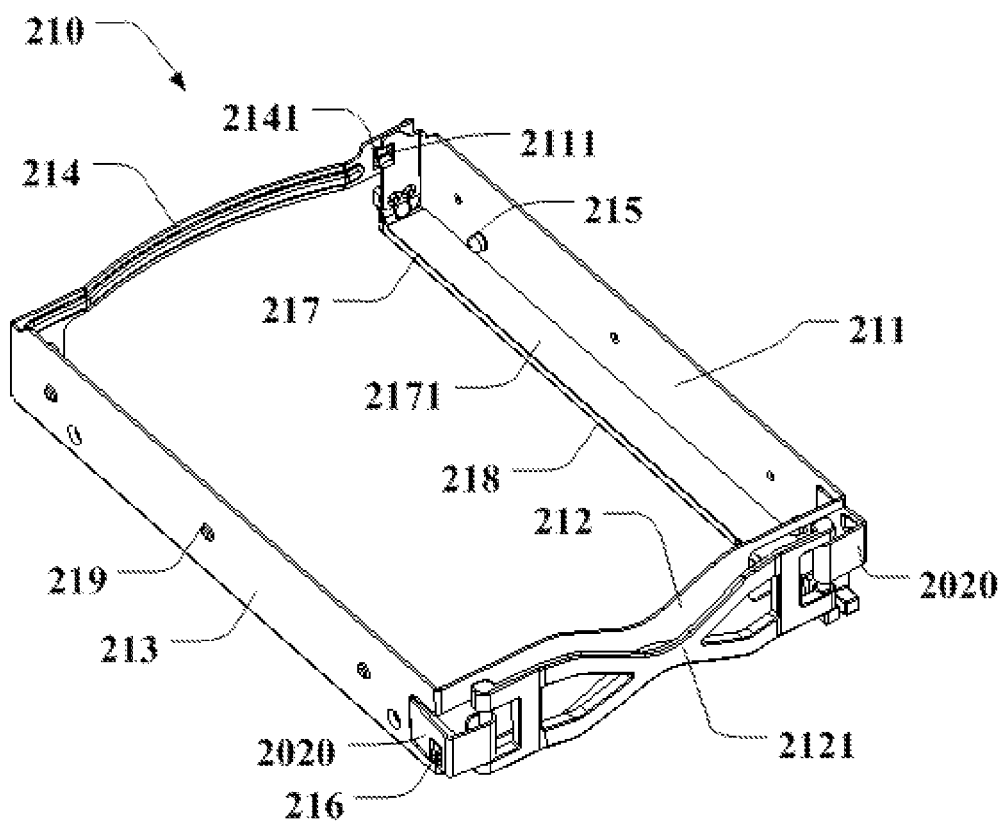
FIG. 4 is a schematic diagram of a structure of a hard disk holder in an embodiment of this application.

FIG. 3 is a schematic diagram of a structure of a hard disk in an embodiment of this application. As shown in FIG. 3, the hard disk 200 includes a hard disk holder 210 and a hard disk body 220. The hard disk body 220 includes an electronic component and has a storage function. The hard disk body 220 is mounted on the hard disk holder 210 through fastening. The hard disk holder 210 includes an integrated sheet metal framework, that is, the hard disk holder 210 is an integrated sheet metal framework prepared by using a sheet metal process. FIG. 4 is a schematic diagram of a structure of a hard disk holder in an embodiment of this application. As shown in FIG. 4, a head end and a tail end of an integrated sheet metal framework are connected in a clamping manner, to form a closed frame to carry a hard disk body 220. Specifically, the integrated sheet metal framework includes a first side plate 211, a head end plate 212, a second side plate 213, and a tail end plate 214 that are disposed in sequence. That is, the first side plate 211, the head end plate 212, the second side plate 213, and the tail end plate 214 are of an integrated structure. The various portions are formed by bending by using the sheet metal process. An inner side of the first side plate 211 and an inner side of the second side plate 213 each have a limiting bulge 215, and the hard disk body 220 has limiting holes. The limiting bulges 215 adapt to the limiting holes. When the hard disk body 220 is mounted to the hard disk holder 210, the limiting bulges 215 extend into the limiting holes to form a limiting structure. Thus, the hard disk body 220 can be reliably mounted in the hard disk holder 210.

To improve universality of the hard disk holder 210, the limiting holes of the hard disk body 220 may be screw holes 230, and the limiting bulges 215 can adapt to the screw holes 230. In this solution, the hard disk holder 210 provided in this application can also be used for the hard disk body 220 commonly used in the market at the present. The hard disk holder 210 is an integrated sheet metal framework, and has an elasticity itself. The hard disk holder 210 can be opened and closed by using one clamping mount structure. Therefore, the structure of the hard disk holder 210 is simple, and operations of mounting and removing the hard disk body 220 are convenient, which can save procedures and time for assembling the hard disk 200, thereby saving human and material resources and reducing costs. In addition, the sheet metal hard disk holder 210 has a good thermal conductivity, thereby helping improve a heat dissipation property of the hard disk 200. The sheet metal hard disk holder 210 is thin and occupies a small space, which helps improve miniaturization of the hard disk 200, thereby improving a layout density of the hard disk 200 in the electronic device and improving integration of the electronic device.

Since the integrated sheet metal framework is thin, a size of the hard disk holder is small, and a size of the hard disk is also small. Specifically, a distance between an outer side surface of the first side plate and an outer side surface of the second side plate is less than or equal to 71.2 mm. That is, after the hard disk body is mounted on the hard disk holder, a width of a formed hard disk is not greater than 71.2 mm.

Therefore, the hard disk is narrow and thus occupies a small space, which helps improve the integration of the electronic device.

It should be noted that, in this embodiment of this application, the mentioned "inner side" is a direction towards a framework enclosed by the first side plate 211, the head end plate 212, the second side plate 213, and the tail end plate 214 of the hard disk holder 210. When the hard disk body 220 is mounted on the hard disk holder 210, the inner side refers to a direction towards the hard disk body 220. Correspondingly, the "outer side" refers to a direction opposite to the "inner side", that is, a direction towards the outside of the framework of the hard disk holder 210. When the hard disk body 220 is mounted in the hard disk holder 210, the "outer side" refers to a direction facing away from the hard disk body 220.

Still referring to FIG. 4, in a specific embodiment, the tail end plate 214 is clamped to the first side plate 211, so that the first side plate 211, the head end plate 212, the second side plate 213, and the tail end plate 214 may form a fully closed framework. During specific implementation, the tail end plate 214 may have a first clamping mount 2141, and the first side plate 211 may have a first clamping head 2111. The first clamping mount 2141 and the first clamping head 2111 can be clamped, to implement connection between the tail end plate 214 and the first side plate 211. In this solution, by using the connection solution in which the first clamping mount 2141 is clamped to the first clamping head 2111, a connection structure is reliable, and the first clamping mount 2141 is not easily separated from the first clamping head 2111. In addition, a process of connecting the first clamping mount 2141 to the first clamping head 2111 is convenient, facilitating the operation. In the connection manner of clamping the tail end plate 214 to the first side plate 211, after the hard disk is mounted in the hard disk mounting slot of the housing, the connection structure is located between a bottom of the hard disk and the hard disk mounting slot, is not easily interfered with by other structures and is not easily affected by an external environment. In addition, the first clamping mount 2141 and the first clamping head 2111 are controlled to be clamped and separated by using an elasticity of the tail end plate, so that an operation is simpler and a misoperation is not likely to occur. Of course, in other embodiments, the tail end plate may also have a first clamping head, and the first side plate has a first clamping mount. This is not limited in this application.

Figure 5:
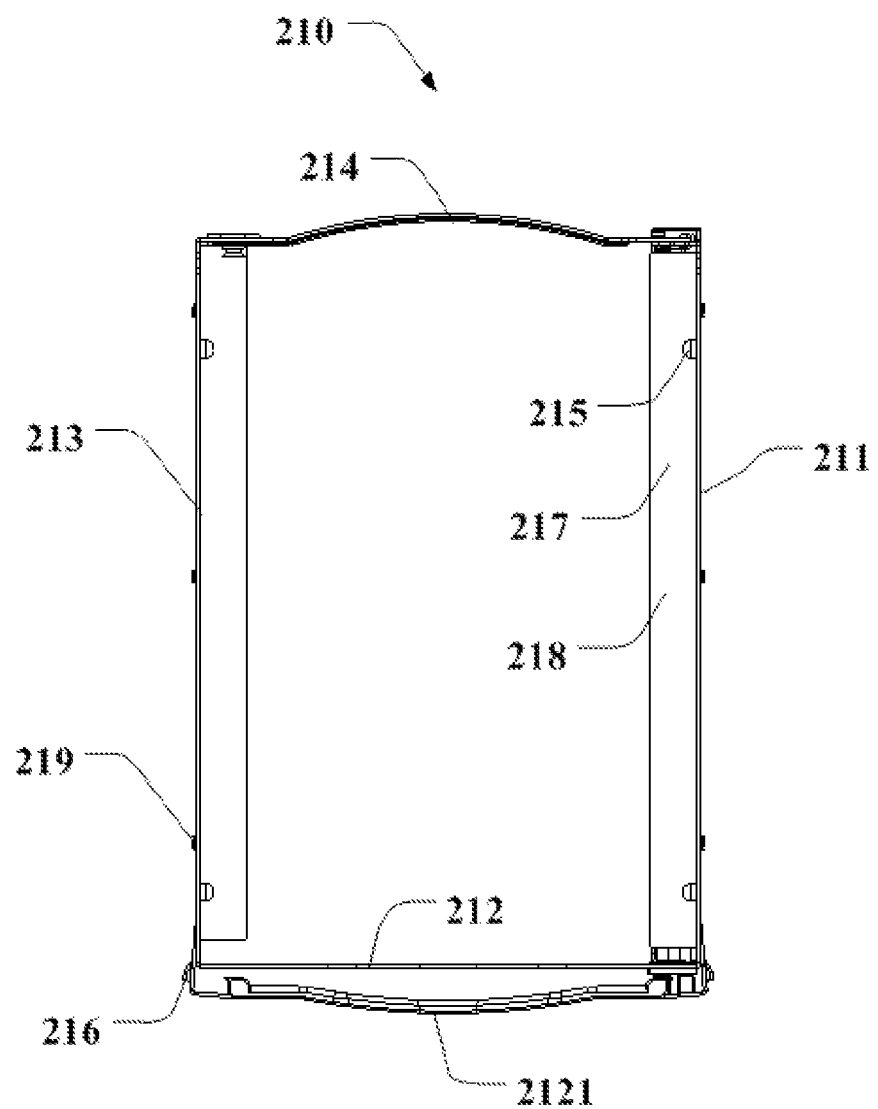
FIG. 5 is a top-view schematic diagram of a structure of a hard disk holder in an embodiment of this application.

FIG. 5 is a top-view schematic diagram of a structure of a hard disk holder in an embodiment of this application. As shown in FIG. 5, when the tail end plate 214 is specifically configured, the tail end plate 214 may be a bent tail end plate 214, and a concave surface of the bent tail end plate 214 faces an inner side of the hard disk holder 210. After the tail end plate 214 is clamped to the first side plate 211, the bent tail end plate 214 is pushed towards the inner side of the hard disk holder 210, and the bent tail end plate 214 is deformed to extend, so that a clamping structure between the tail end plate 214 and the first side plate 211 is tripped, thereby opening the hard disk holder 210. The hard disk body 220 is mounted in the hard disk holder 210. The bent tail end plate 214 is then fastened to the first side plate 211, so that the tail end plate 214 is clamped to the first side plate 211. During removal of the hard disk body 220 from the hard disk holder 210, the bent tail end plate 214 is pushed towards the inner side of the hard disk holder 210, and the bent tail end plate 214 is deformed to extend, so that the clamping structure between the tail end plate 214 and the first side plate 211 is tripped, thereby opening the hard disk holder 210. The hard disk body 220 is removed from the hard disk holder 210. In this solution, the tail end plate 214 and the first side plate 211 are clamped by using the elasticity of the sheet metal structure. The hard disk holder 210 has a simple structure and is convenient to operate.

Of course, in other embodiments, the structure for implementing the clamping between the tail end plate 214 and the first side plate 211 may further be another structure. For example, clamping by cooperation with a spring or a clamping mount assembly can implement the technical solutions in the embodiments of this application.

As shown in FIG. 4, the tail end plate 214 of the hard disk holder 210 is narrow, to avoid an interface of the hard disk body 220 and facilitate plugging of the hard disk 200 to a circuit board of an electronic device.

Alternatively, in other embodiments, the head end plate may also be clamped to the first side plate. Specifically, the head end plate may have a first clamping mount, and the first side plate may have a first clamping head. The first clamping mount is clamped to the first clamping head, so that the integrated sheet metal framework is formed into a closed structure. In this solution, during specific setting of the clamping structure between the head end plate and the first side plate, other fitting structures need to be avoided, to ensure reliability of the clamping structure between the head end plate and the first side plate.

To facilitate unlocking of the clamping structure between the head end plate and the first side plate, the head end plate may be a bent head end plate, and a concave surface of the bent head end plate faces an inner side of the hard disk holder. In this case, the bent head end plate is pushed from an outer side of the hard disk holder to the inner side of the hard disk holder, so that the bent head end plate extends, which can unlock the clamping structure between the head end plate and the first side plate, and an operation is convenient.

Alternatively, any one of the first side plate 211, the head end plate 212, the second side plate 213, or the tail end plate 214 includes two portions. The two portions are clamped, that is, the clamping structure is located on the first side plate 211, the head end plate 212, the second side plate 213, or the tail end plate 214. In summary, the clamping structure may be located in any position of the integrated sheet metal framework.

Still referring to FIG. 4, sides, close to the head end plate 212, of the first side plate 211 and the second side plate 213 of the hard disk holder 210 have second clamping heads 216. For the hard disk mounting slot of the electronic device, the hard disk mounting slot has second clamping mounts. The second clamping heads 216 of the first side plate 211 and the second side plate 213 can be clamped to the second clamping mounts, so that the hard disk holder 210 can be mounted in the hard disk mounting slot through fastening. In this solution, a process of preparing a clamping mount on the integrated sheet metal framework is simple, and the hard disk 200 is connected to the hard disk mounting slot in the clamping manner, thereby facilitating operations. In addition, in this solution, the second clamping heads 216 are arranged on the hard disk holder, and the second clamping mounts are arranged on the hard disk mounting slot. Since the second clamping mounts will not protrude from side wall surfaces of the hard disk mounting slot, when the hard disk holder drives the hard disk body to be mounted into the hard disk mounting slot, the first side plate and the second side plate will not scratch side walls of the hard disk mounting slot.

Still referring to FIG. 4, during specific setting of the head end plate 212 of the hard disk holder 210, a pull handle 2121 may be mounted on an outer side of the head end plate 212. After the hard disk 200 is mounted on the electronic device, when the hard disk 200 needs to be removed, an operator may remove the hard disk 200 from the electronic device by pulling the pull handle 2121. An operation process is simple.

Specifically, the pull handle 2121 may be an elastic pull handle. The elastic pull handle is elastic and has a good user experience. Specifically, to mount the elastic pull handle, two ends of the elastic pull handle may be mounted at two ends of the head end plate 212, so that when the hard disk 200 is pulled out, the two ends of the hard disk 200 in a width direction are stressed, and the hard disk 200 can be pulled out conveniently.

When the first side plate 211 and the second side plate 213 of the hard disk holder 210 have the second clamping heads 216 that are clamped to the hard disk mounting slot, the user may pull the pull handle 2121 to deform the head end plate 212, so that the second clamping heads 216 of the first side plate 211 and the second side plate 213 are separated from the second clamping mounts of the hard disk mounting slot, and the hard disk 200 is directly removed from the hard disk mounting slot. In this solution, the second clamping heads 216 are separated from the second clamping mounts without an additional operation. The pull handle 2121 may be pulled to unlock the hard disk 200 and remove the hard disk 200 from the hard disk mounting slot at the same time. The structure of the hard disk holder 210 is simple, and an operation is convenient.

In a specific embodiment, the first side plate 211 and the second side plate 213 may each have an extending portion 2120. The extending portions 2120 extend out of the head end plate 212, and the two ends of the elastic pull handle are respectively connected to the extending portions 2120 of the first side plate 211 and the second side plate 213. The second clamping heads 216 are arranged on the extending portions 2120. The elastic pull handle may pull the extending portions 2120, so that a distance between two adjacent extending portions 2120 is shortened, and the second clamping heads 216 are separated from the second clamping mounts of the hard disk mounting slot, thereby directly removing the hard disk 200 from the hard disk mounting slot. Since the extending portions 2120 are equivalent to cantilevers, an elasticity of the extending portions 2120 is good, and it is convenient to pull the extending portions 2120 by using the elastic pull handle, so that the second clamping heads 216 are separated from the second clamping mounts.

Still referring to FIG. 4, the first side plate 211 and the second side plate 213 of the integrated sheet metal framework further have supporting plates 217. Specifically, the first side plate 211 and the supporting plate 217 corresponding to the first side plate may be of an integrated structure, that is, the first side plate 211 and the supporting plate 217 are formed by bending, and the supporting plate 217 may be perpendicular to the first side plate 211. The second side plate 213 and the supporting plate 217 corresponding to the second side plate may also be of an integrated structure, that is, the second side plate 213 and the supporting plate 217 are formed by bending, and the supporting plate 217 may be perpendicular to the second side plate 213. The supporting plates 217 may support the hard disk body 220, to improve reliability of mounting the hard disk body 220 on the hard disk holder 210. In addition, the supporting plates 217 may be further configured to mount a slider, so that the hard disk holder 210 is slidably mounted on the housing 100 of the electronic device. The slider is mounted on the supporting plates 217, so that the hard disk 200 can have a good bearing capacity after being mounted on the housing 100, and the hard disk 200 is reliably and stably mounted in the housing 100.

One side of the hard disk body 220 facing the supporting plates 217 has an exposed circuit board. To prevent the hard disk holder 210 from causing a short circuit problem in the circuit board, inner sides of the supporting plates 217 have insulation pads 2171. That is, the insulation pads 2171 are arranged between the supporting plates 217 and the circuit board of the hard disk body 220, to prevent the short circuit problem in the circuit board of the hard disk body 220. Of course, if the hard disk body 220 also has exposed circuit boards at other positions, insulation pads 2171 need to be arranged between the exposed circuit boards of the hard disk body 220 and the hard disk holder 210.

To improve structural strength of the hard disk holder 210, the supporting plate 217 of the second side plate 213 may further extend to the tail end plate 214, and a region of the supporting plate 217 extending to the tail end plate 214 is connected to the tail end plate 214 through fastening by using a rivet, to improve reliability of connection between the tail end plate 214 and the second side plate 213.

As shown in FIG. 4, the hard disk holder 210 further includes a light pipe mounting slot 218, and the light pipe mounting slot 218 extends in an extending direction of the first side plate 211. The hard disk 200 is provided with a light pipe in the light pipe mounting slot 218, and the light pipe extends from the head end plate 212 to the tail end plate 214. When the hard disk 200 is mounted to the housing 100, the hard disk 200 is connected to the circuit board. The circuit board is provided with an indicator lamp. One side of the light pipe close to the tail end plate 214 is opposite to the indicator lamp, so that light emitted by the indicator lamp may be conducted, via the light pipe, to one side on which the head end plate 212 is located, and the user may observe a state of the indicator lamp to obtain a working state of the hard disk 200. In one embodiment, the light pipe mounting slot 218 and the supporting plates 217 may be of an integrated structure, and the insulation pads 2171 are arranged on one side of the light pipe mounting slot 218 facing the hard disk body 220.

Still referring to FIG. 4, an outer side of the first side plate 211 of the hard disk holder 210 has a vibration attenuation member 219, and an outer side of the second side plate 213 also has a vibration attenuation member 219. The vibration attenuation members 219 may enable the first side plate 211 and the second side plate 213 to be in stable contact with the hard disk mounting slot, so that the hard disk 200 is stably mounted in the hard disk mounting slot, and is not easy to vibrate.

In a specific embodiment, a specific shape and structure of the vibration attenuation member 219 are not limited, and the vibration attenuation member may be a vibration attenuation protruding dot, a vibration attenuation protruding bar, or a vibration attenuation protruding mesh. In conclusion, the vibration attenuation members 219 protrude from surfaces of the first side plate 211 and the second side plate 213, and may be specifically in a dot shape, a bar shape, a mesh shape, or the like. This is not limited in this application.

In an embodiment, the vibration attenuation member 219 may be an elastic material part, for example, a rubber part or a foam part. The elastic material part is bonded and fixed to the first side plate 211 and the second side plate 213. Since the elastic material part is elastic, vibration attenuation effect of the elastic material part is good.

In another embodiment, the vibration attenuation member 219 may also be of an integrated structure with the first side plate 211 or the second side plate 213. That is, the first side plate 211 and the vibration attenuation member 219 located on the first side plate 211 are of an integrated structure, and the second side plate 213 and the vibration attenuation member 219 located on the second side plate 213 are of an integrated structure. Specifically, a sheet metal process may be used to directly form bulges facing outwards on the first side plate 211 and the second side plate 213 of the integrated sheet metal framework. In this solution, a preparation process of the vibration attenuation members 219 is simple. The vibration attenuation members 219 are reliably fixed to the first side plate 211 and the second side plate 213, and are not easy to fall off from the first side plate 211 and the second side plate 213.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A hard disk holder configured to carry a hard disk body, wherein the hard disk holder comprises:
    an integrated sheet metal framework comprising a head end plate and a tail end plate,
        wherein each of the head end plate and the tail end plate of the integrated sheet metal framework is clamped to another part of the integrated sheet metal framework; and
    the integrated sheet metal framework further comprising a first side plate and a second side plate disposed in sequence with respect to one another,
        wherein each of an inner side of the first side plate and an inner side of the second side plate has a limiting bulge configured to be adapted to a limiting hole of the hard disk body,
        wherein the inner side of the first plate is directed towards a framework enclosed by the first side plate,
        wherein the inner side of the second side plate is directed towards a framework enclosed by the second side plate, and
        wherein sides of the first and second side plates, close to the head end plate, have clamping heads configured to be clamped to clamping mounts of a hard disk mounting slot of an electronic device.

2. The hard disk holder according to claim 1, wherein the tail end plate is clamped to the first side plate.

3. The hard disk holder according to claim 2, wherein the tail end plate is a bent tail end plate, and a concave surface of the bent tail end plate faces an inner side of the hard disk holder.

4. The hard disk holder according to claim 1, wherein the head end plate is clamped to the first side plate.

5. The hard disk holder according to claim 4, wherein the head end plate is a bent head end plate, and a concave surface of the bent head end plate faces the inner side of the hard disk holder.

6. The hard disk holder according to claim 1, wherein a pull handle is mounted on an outer side of the head end plate.

7. The hard disk holder according to claim 1, further comprising an elastic pull handle that is pulled to unlock the clamping heads from the clamping mounts,
    wherein one end of the elastic pull handle is connected to the side of the first side plate close to the head end plate, and
    wherein another end of the elastic pull handle is connected to the side of the second side plate close to the head end plate.

8. The hard disk holder according to claim 1, wherein the first side plate and the second side plate of the integrated sheet metal framework each has a supporting plate, and the supporting plate is perpendicular to the first side plate.

9. The hard disk holder according to claim 8, wherein an inner side of the supporting plate has an insulation pad.

10. The hard disk holder according to claim 1, further comprising a light pipe mounting slot extending in an extending direction of the first side plate.

11. The hard disk holder according to claim 1, wherein an outer side of the first side plate and an outer side of the second side plate each has a vibration attenuation member.

12. The hard disk holder according to claim 11, wherein the vibration attenuation member comprises a vibration attenuation protruding dot, a vibration attenuation protruding bar, or a vibration attenuation protruding mesh.

13. The hard disk holder according to claim 11, wherein the first side plate and the vibration attenuation member of the first side plate are of an integrated structure, and the second side plate and the vibration attenuation member of the second side plate are of an integrated structure.

14. The hard disk holder according to claim 11, wherein the vibration attenuation members are elastic material parts bonded and fastened to the first side plate and the second side plate.

15. The hard disk holder according to claim 1, wherein a distance between an outer side surface of the first side plate and an outer side surface of the second side plate is less than or equal to 71.2 mm.

16. A hard disk comprising:
    a hard disk holder and a hard disk body, wherein the hard disk body is mounted on the hard disk holder through fastenings, and limiting bulges of the hard disk holder are connected to limiting holes of the hard disk body in a limiting manner;
    the hard disk holder is configured to carry the hard disk body and comprises an integrated sheet metal framework,
        wherein a head and a tail of the integrated sheet metal framework are clamped, and
        wherein the integrated sheet metal framework comprises a first side plate, a head end plate, a second side plate, and a tail end plate that are disposed in sequence; and
    an inner side of the first side plate and an inner side of the second side plate each having a limiting bulge configured to be adapted to a limiting hole of the hard disk body, and
        wherein sides of the first and second side plates, close to the head end plate, have clamping heads configured to be clamped to clamping mounts of a hard disk mounting slot of an electronic device.

17. The hard disk according to claim 16, further comprising a light pipe, wherein the hard disk holder comprises a light pipe mounting slot; and the light pipe is mounted in the light pipe mounting slot, and conducts a light source located on one side of the tail end plate to one side of the head end plate.

18. An electronic device comprising:
a housing and a hard disk, wherein the housing comprises a hard disk mounting slot, and the hard disk is mounted in the hard disk mounting slot;
the hard disk comprising a hard disk holder and a hard disk body, wherein the hard disk body is mounted on the hard disk holder through fastening, and limiting bulges of the hard disk holder are connected to limiting holes of the hard disk body in a limiting manner;
the hard disk holder is configured to carry the hard disk body and comprises an integrated sheet metal framework, wherein a head and a tail of the integrated sheet metal framework are clamped,
  wherein the integrated sheet metal framework comprises a first side plate, a head end plate, a second side plate, and a tail end plate that are disposed in sequence; and
an inner side of the first side plate and an inner side of the second side plate each having a limiting bulge,
  wherein each of the limiting bulges adapts to one of the limiting holes, and
  wherein sides of the first and second side plates, close to the head end plate, have clamping heads configured to be clamped to clamping mounts of a hard disk mounting slot of an electronic device.

19. The electronic device of claim 18, wherein the hard disk further comprises a light pipe, wherein the hard disk holder comprises a light pipe mounting slot; and the light pipe is mounted in the light pipe mounting slot, and conducts a light source located on one side of the tail end plate to one side of the head end plate.

20. The electric device of claim 18 wherein the hard disk holder further comprises an elastic pull handle that is pulled to unlock the clamping heads from the clamping mounts,
  wherein one end of the elastic pull handle is connected to the side of the first side plate close to the head end plate, and
  wherein another end of the elastic pull handle is connected to the side of the second side plate close to the head end plate.

* * * * *